(12) United States Patent
Sekii

(10) Patent No.: US 7,550,887 B2
(45) Date of Patent: Jun. 23, 2009

(54) SPINDLE MOTOR AND METHOD OF MANUFACTURING SPINDLE MOTOR

(75) Inventor: Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 451 days.

(21) Appl. No.: 11/164,505

(22) Filed: Nov. 28, 2005

(65) Prior Publication Data

US 2006/0255673 A1 Nov. 16, 2006

(30) Foreign Application Priority Data

Nov. 26, 2004 (JP) ............................. 2004-341481

(51) Int. Cl.
*H02K 5/16* (2006.01)

(52) U.S. Cl. ....................................................... 310/90

(58) Field of Classification Search ................... 310/90; 384/110

See application file for complete search history.

(56) References Cited

U.S. PATENT DOCUMENTS

| | | | |
|---|---|---|---|
| 6,731,456 B2* | 5/2004 | Parsoneault et al. ...... 360/99.08 |
| 2002/0113507 A1* | 8/2002 | Nottingham et al. .......... 310/90 |
| 2003/0030222 A1 | 2/2003 | Grantz et al. ................ 277/411 |
| 2004/0156568 A1 | 8/2004 | Woldemar et al. .......... 384/100 |

* cited by examiner

*Primary Examiner*—Nguyen N Hanh
(74) *Attorney, Agent, or Firm*—Volentine & Whitt, PLLC

(57) ABSTRACT

A spindle motor in which a rotor is rotatably supported via a pair of upper and lower bushes fixed to a shaft. In a part of the rotor, upper and lower covers are fixed so as to face the upper and lower bushes each via a gap. The inner periphery of the upper cover faces the outer peripheral surface of the shaft via a small clearance in the radial direction, and the inner periphery of the lower cover shorter than the inner periphery of the upper cover faces the outer peripheral surface of the shaft via the clearance in the radial direction.

18 Claims, 13 Drawing Sheets

SPINDLE MOTOR AND METHOD OF MANUFACTURING SPINDLE MOTOR

BACKGROUND OF THE INVENTION

1. Field of the Invention

The present invention relates to a shaft-fixed spindle motor using a fluid dynamic bearing and a method of manufacturing the spindle motor.

2. Background Art

In recent years, a spindle motor for use in a hard disk driving apparatus or the like is requested to realize further reduction in cost, and excellent reliability and durability.

FIG. 13 shows a conventional spindle motor. In the spindle motor, a pair of conical members 310 are provided so as to be apart from each other in the axial direction around a shaft 204, and dynamic bearings are constructed in minute gaps between the pair of conical members 310 and sleeves facing the pair of conical members 310. An oil reservoir 380 is constructed in a space wider than the minute gap, between a shield member 328 fixed to the sleeve and the conical member 310. The outer peripheral surface of the shaft 204 and the inner peripheral surface of the shield member 328 are disposed so as to be close to each other. Oil is applied to the inside of the dynamic bearing via a through-hole 350 in the shield member 328.

However, in the case where the minute gap and the space wider than the minute gap mixedly exist in the motor as described above, it is sometimes difficult to assemble the motor. Specifically, in the spindle motor of FIG. 13, for example, in the case of applying oil to the inside of the dynamic bearing in the environment that the pressure in the periphery is reduced, gas in the dynamic bearing is exhausted from the through-hole 350 and a relatively small region between the shaft 204 and the shield member 328 to the outside of the motor. Consequently, it takes time to exhaust the gas so that workability is not so high. When oil is applied in a state where air bubbles remain in the dynamic bearing, at the time the air bubbles are exhausted from the inside of the dynamic bearing to the outside of the motor, the oil is also leaked together with the air bubbles to the outside of the motor, and the space in the hard disk driving apparatus, which has to be kept clean becomes dirty.

BRIEF SUMMARY OF THE INVENTION

According to the invention, a work of infusing a lubricant fluid and a work of recognizing an infusion state of the lubricant fluid can be facilitated.

In the present invention, leakage of the lubricant fluid to the outside of a motor can be prevented.

Further, in the present invention, a spindle motor having excellent reliability and excellent durability and a method of manufacturing the spindle motor can be provided.

In a spindle motor as an example of the present invention, a rotor is supported rotatably via a pair of upper and lower bushes fixed to a shaft. In part of the rotor, upper and lower covers are fixed so as to face the upper and lower bushes, respectively, each via a minute gap. The circumferential edge of the upper cover faces the circumferential face of the shaft via a small clearance in the radial direction, and the circumferential face of the lower cover shorter than the circumferential face of the upper cover faces the circumferential face of the shaft via a clearance in the radial direction.

In an example of the present invention, the spindle motor can be easily assembled. The gas-liquid interface formed in a gap between the lower cover and the lower bush can be easily visually observed from the outside of the lower cover. Therefore, the application amount of oil can be easily recognized by the position in which the gas-liquid interface is formed.

DETAILED DESCRIPTION OF THE INVENTION

Figure 1:
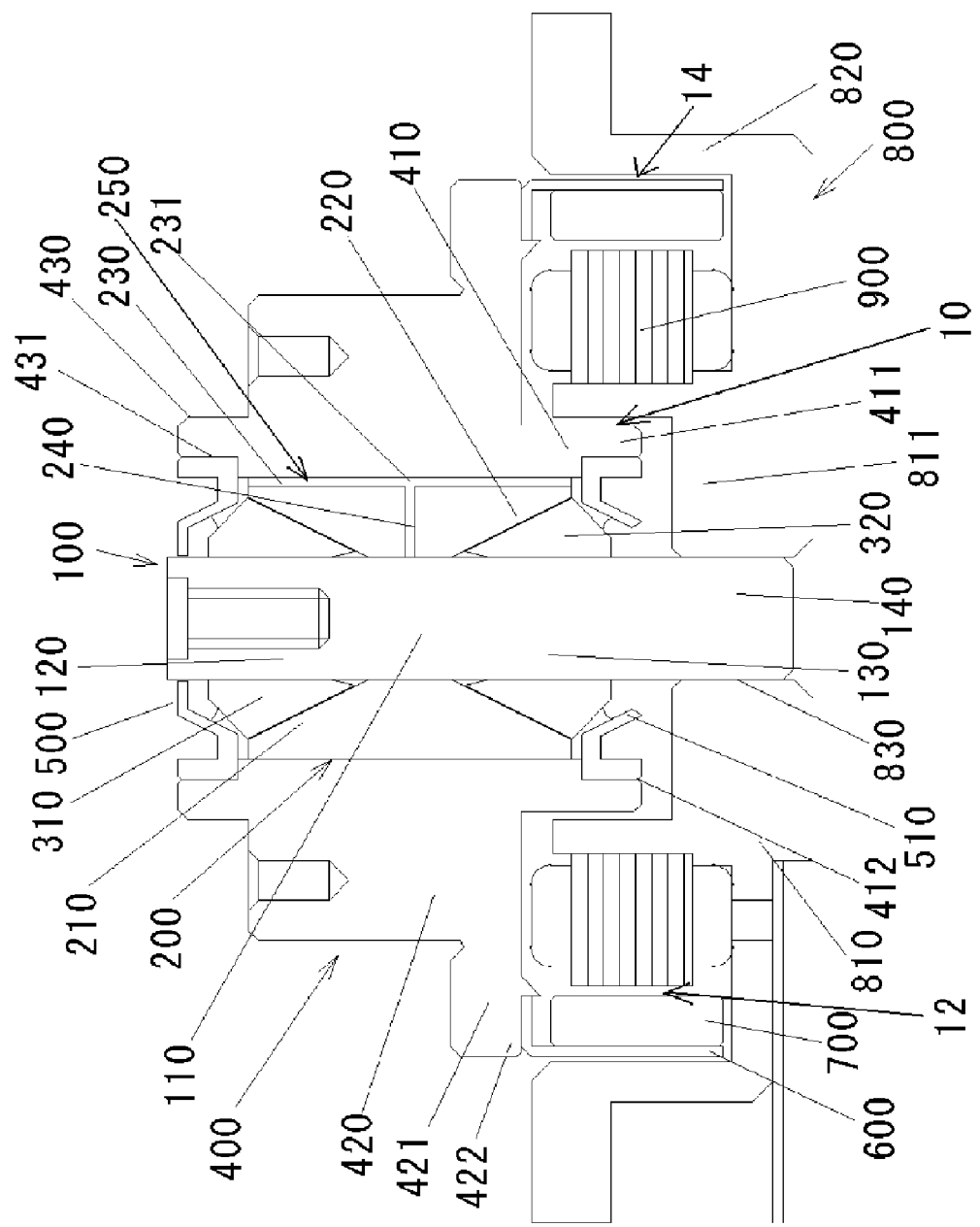
FIG. 1 is a longitudinal section of a motor manufactured by a manufacturing method of an embodiment of the invention.

An embodiment of a spindle motor according to the present invention and a method of manufacturing the spindle motor will be described with reference to FIGS. 1 to 12. When the positional relations and directions of members are described by up, down, right, and left in the description of the invention, they indicate positional relations and directions in the drawings, not positional relations and directions when the members are assembled in an actual device.

FIG. 1 is a longitudinal section showing an example of a spindle motor manufactured by the manufacturing method of the present invention. The vertical direction in FIG. 1 is the axial direction.

An cylindrical-shaped sleeve 200 having bores on upper and lower sides in the axial direction faces the outer peripheral surface of a cylindrical shaft 100 via a minute gap in a center part 110 of the shaft 100. In the sleeve 200, an upper bore 210 and a lower bore 220 are formed. An upper bush 310 and a lower bush 320 are fixed to an upper part 120 and a lower part 130, respectively, of the shaft 100 so as to face the surface of the upper bore 210 and the surface of the lower bore 220, respectively, of the sleeve 200 each via a small gap.

A groove 230 is formed along the outer peripheral surface of the sleeve 200 in the axial direction of the whole cylindrical part. In a center part 231 in the axial direction of the groove 230, a radial connecting path 240 radially penetrating from the outer peripheral surface of the sleeve 200 to the inner peripheral surface of the sleeve 200 is formed. A rotor hub 400 is fixed to the outer peripheral surface of the sleeve 200 by, for example, press fitting, adhesion, or the like. By fixing the rotor hub 400 and the sleeve 200, the groove 230 formed in the sleeve 200 is surrounded by the inner peripheral surface of the rotor hub 400, thereby forming a connecting path 250. By forming the sleeve 200 and the rotor hub 400 by different members as described above, each of the members can be formed in a simple shape, so that complicated process can be avoided, and the sleeve and the rotor hub can be formed at low cost. In addition, by forming the radial connecting paths 240 and the connecting path 250, the upper fluid dynamic bearing and the lower fluid dynamic bearing can communicate with each other with oil. Consequently, pressures generated in the pair of fluid dynamic bearings are balanced, so that a rotor can be supported stably.

A rotor hub 400 is an cylindrical-shaped member having an inside cylindrical part 410 and an outside cylindrical part 420. An upper bore 431 is formed in an upper end 430 of the rotor hub 400, and a lower bore 412 is formed in a lower end 411 of the inside cylindrical part 410. To the upper bore 431 and the lower bore 412, an upper cover 500 and a lower cover 510 are fixed so as to face the upper bush 310 and the lower bush 320, respectively, each via a gap. In the lower part of the outside cylindrical part 420, a disk mounting part 421 on which a magnetic disk (not shown) such as a hard disk extending to the outside in the radial direction is to be mounted is formed. A yoke 600 having an cylindrical shape is fixed to a lower outer peripheral part 422 of the disk mounting part 421. A ring-shaped magnet 700 is fixed to the inner peripheral surface of the yoke 600 by, for example, adhesion.

A base plate 800 has a cylindrical shape constructed by an inner cylindrical part 810 and an outer cylindrical part 820. A through hole 830 is formed in the center of the case 800 to fix a lower end 131 of the shaft 100. A base plate recess 811 is formed on the inside of the inner cylindrical part 810, and the inner peripheral surface of the base plate recess 811 and the outer peripheral surface of the inside cylindrical part 410 of the rotor hub 400 face each other in the radial direction and form a first small clearance 10. A stator 900 is fixed to the outer peripheral surface of the base plate recess 811 by, for example, press-fit adhesion, and the stator 900 and the magnet 700 face each other in the radial direction and form a second small clearance 12. The inner peripheral surface of the outer cylindrical part 820 of the base plate 800 and the outer peripheral surface of the yoke 600 face each other in the radial direction and form a third small clearance 14.

The minute gaps formed in cooperation with the sleeve 200, upper bush 310, lower bush 320, shaft 100, radial connecting paths 240 and the connecting path 250, upper cover 500, and lower cover 510 are filled with oil as a lubricant fluid without interruption. A gas-liquid interface is formed by the oil stored in each of the gap formed between the upper bush 310 and the upper cover 500 and the gap formed between the lower bush 320 and the lower cover 510.

A dynamic pressure-generating grooves is formed in the inner surface of each of the upper bore 210 and the lower bore 220 of the sleeve 200 and functions, as a fluid dynamic bearing, so that the upper bush 310 and the lower bush 320 do not come into contact with the sleeve 200 at the time the motor rotates. Since the radial connecting paths 240 and the connecting path 250 are formed, the lubricant fluid can circulate in each of the fluid dynamic bearings, and the balance of the pressures can be maintained. Therefore, a stable and highly-reliable dynamic pressure bearing can be realized.

The upper and lower covers 500 and 510 will now be described in detail.

Figure 2:
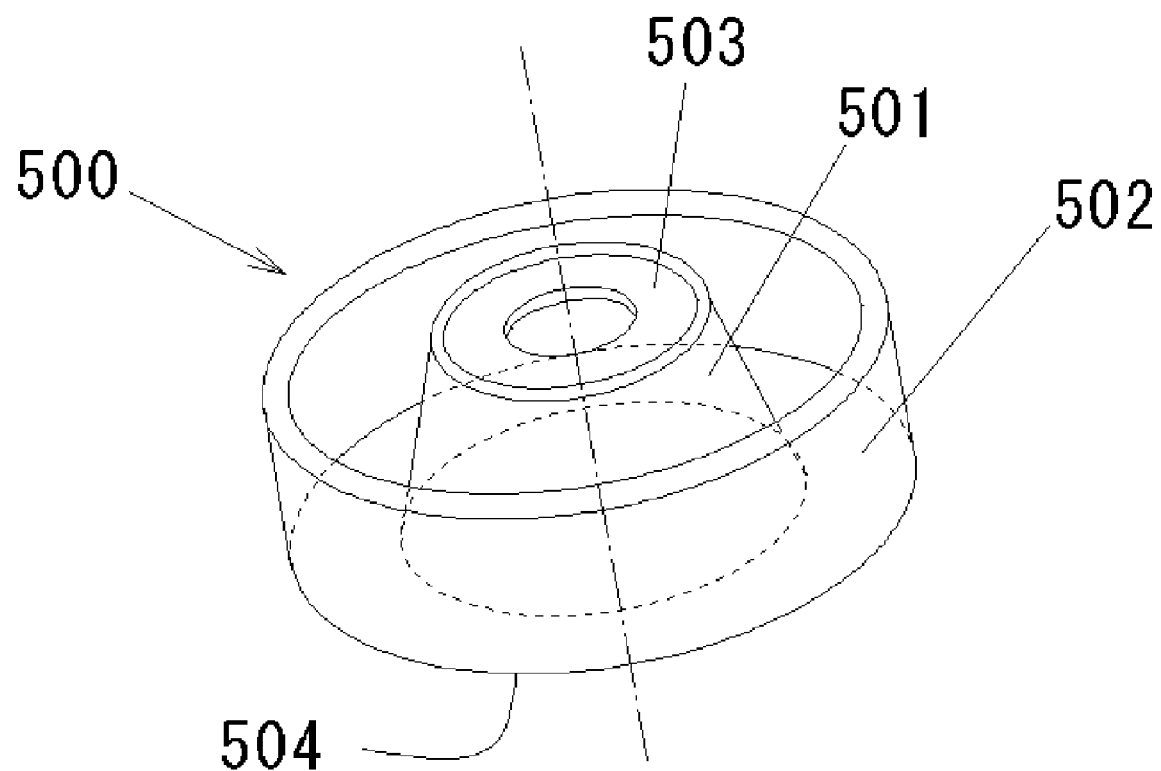
FIG. 2 is a perspective view of an upper seal of the spindle motor of FIG. 1.
Figure 3:
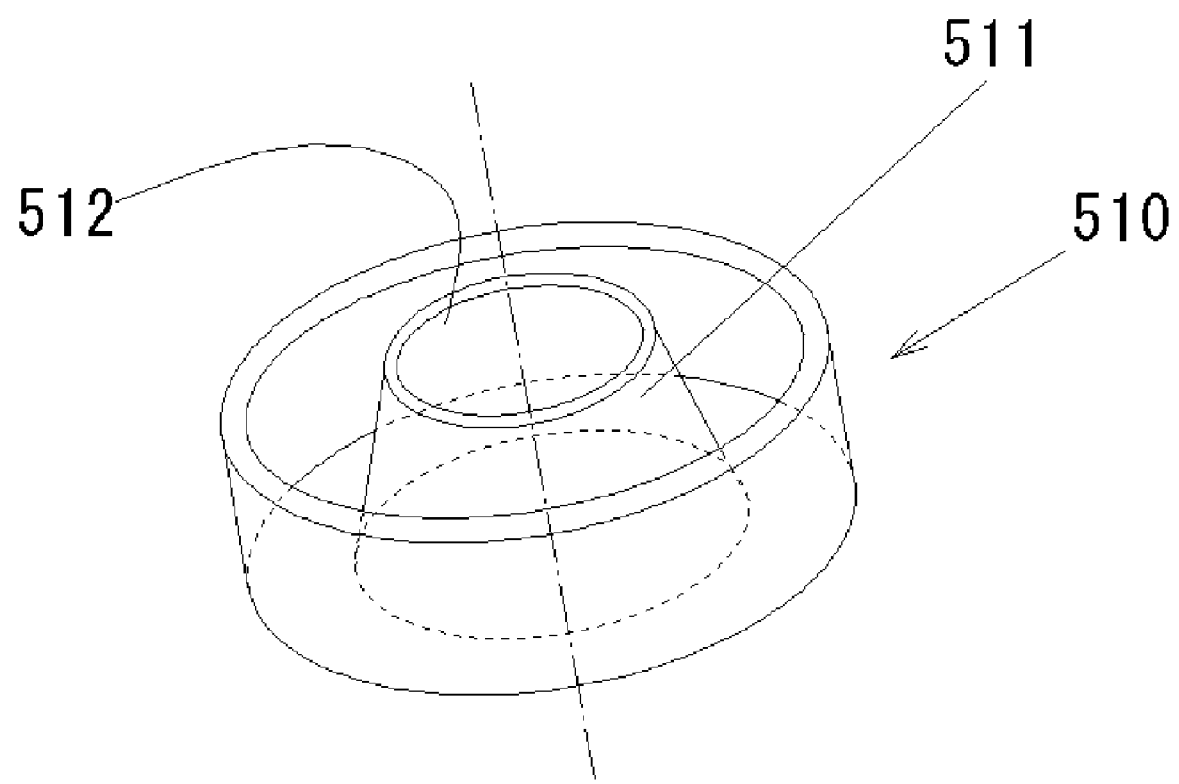
FIG. 3 is a perspective view of a lower seal of the spindle motor of FIG. 1.

FIGS. 2 and 3 are perspective views showing the upper and lower covers 500 and 510, respectively, used in FIG. 1. The alternate long and short dash line in each of FIGS. 2 and 3 indicates the center of the shaft 100.

As shown in FIG. 2, in the upper cover 500, an upper-cover inside cylindrical part 501 and an upper-cover outside cylindrical part 502 are formed. An upper-cover upper end 503 extending from the upper end of the upper-cover inside cylindrical part 501 to the inside in the radial direction is formed in the upper end portion of the upper-cover inside cylindrical part 501. The inner periphery of the upper-cover upper end 503 and the outer peripheral surface of the shaft 100 face each other via a small clearance in the radial direction. The upper-cover inside cylindrical part 501 and the upper-cover outside cylindrical part 502 are coupled to each other via a lower end 504. The lower end 504 and the upper-cover outside cylindrical part 502 are in contact with the upper bore 431 of the rotor hub 400. The upper-cover inside cylindrical part 501 has a tapered shape which is gradually tilted to the inside in the radial direction toward the upper side in the axial direction, and faces the upper bush 310 via a gap.

As shown in FIG. 3, the lower cover 510 has a shape the same as that of the upper cover 500 except that an upper end portion is not formed in the lower cover 510. Consequently, a clearance wider than the small clearance between the inner periphery of the upper-cover upper end 503 and the outer peripheral surface of the shaft 100 is provided between the inner periphery 512 of a lower-cover inside cylindrical part 511 of the lower cover 510 and the outer peripheral surface of the shaft 100.

Figure 4:
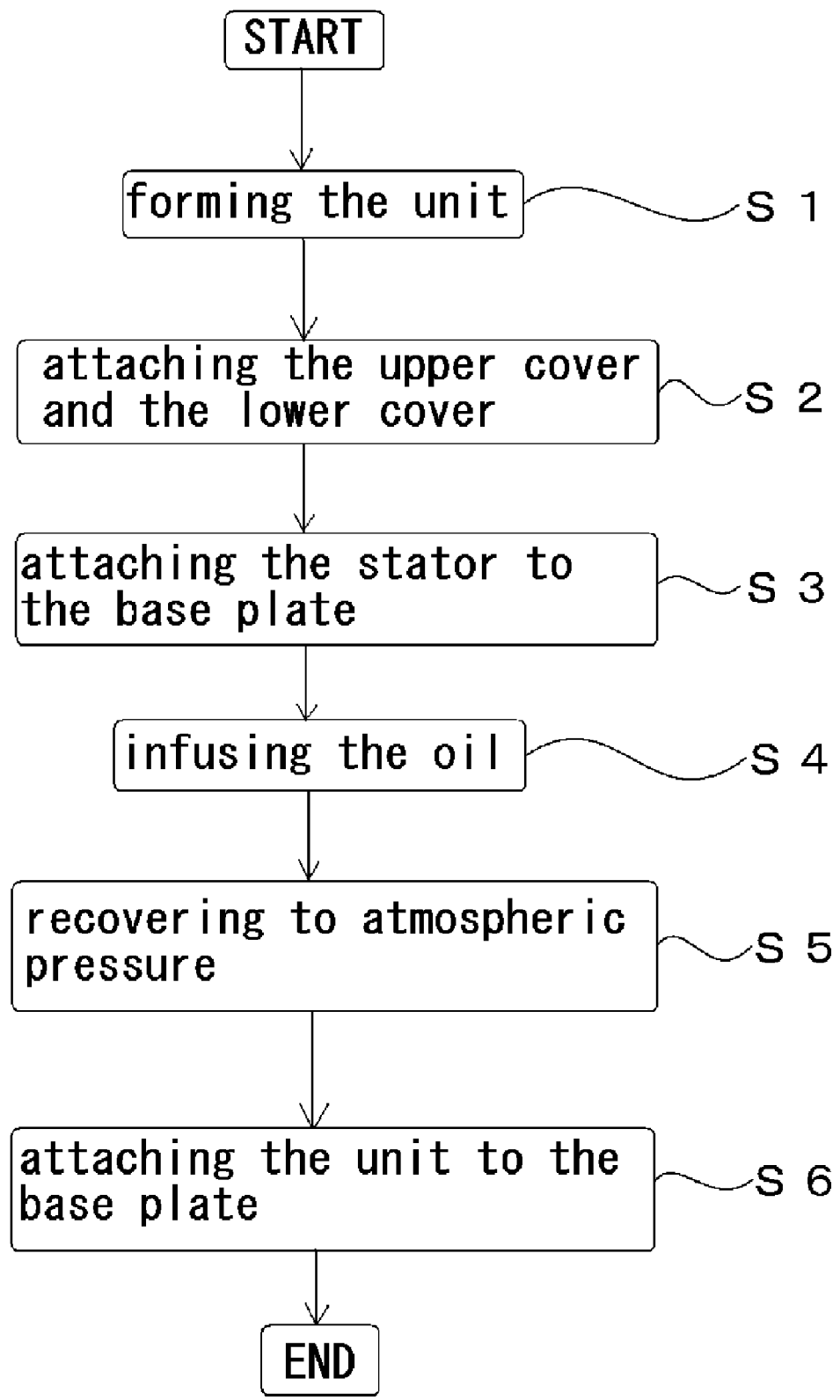
FIG. 4 is a diagram showing an assembling process in a method of manufacturing the spindle motor of FIG. 1.

A process of manufacturing the spindle motor of FIG. 1 will now be described in detail with reference to FIGS. 4 to 10. FIG. 4 shows a process of assembling the spindle motor of FIG. 1. The alternate long and short dash line in each of FIGS. 5 and 6 indicates the axis of a rotary shaft (not shown). FIG. 10 shows the structure which is the same as that of FIG. 1 and illustrates, particularly, the position of the small clearance.

Figure 5:
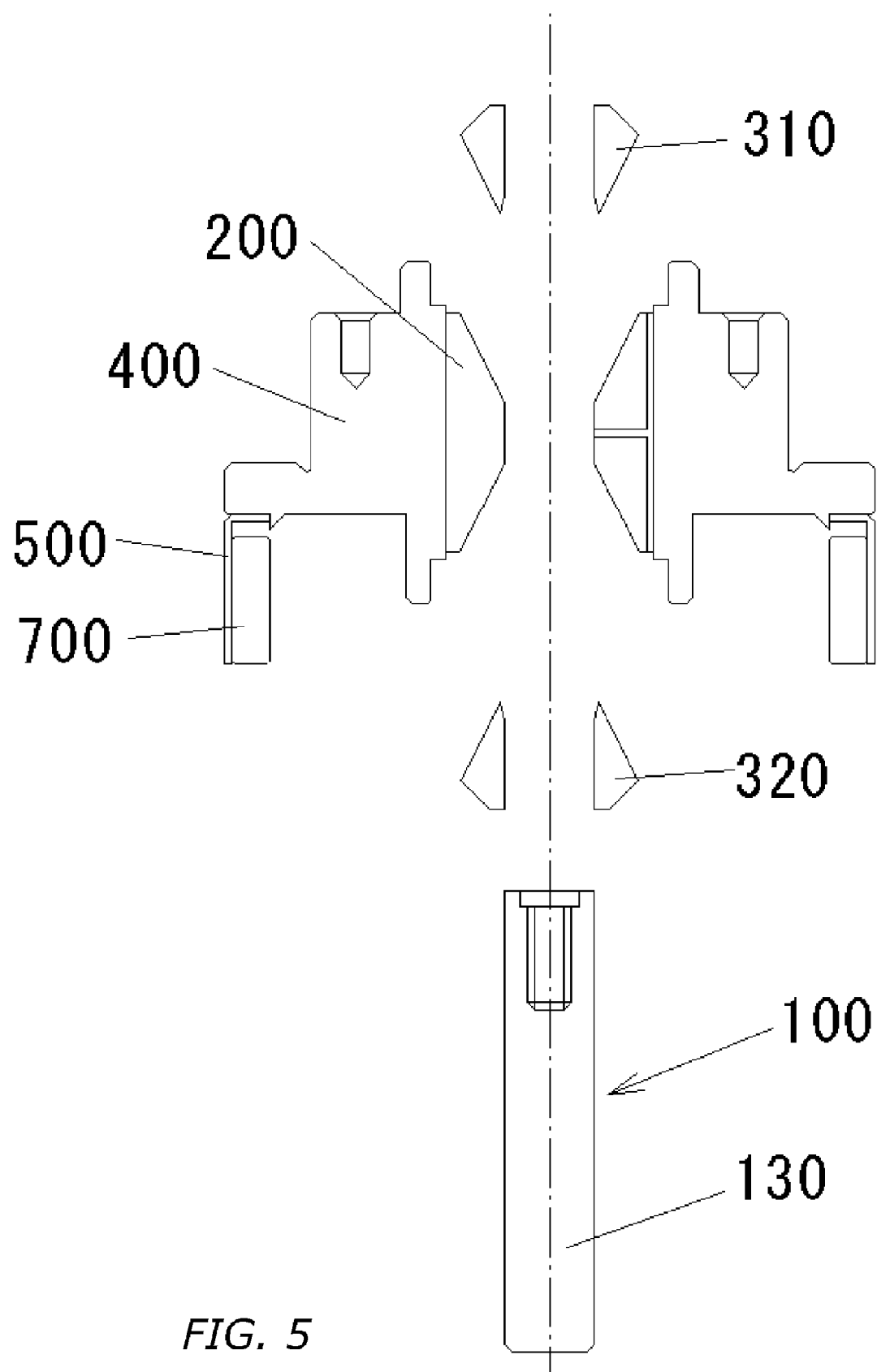
FIG. 5 is a diagram showing step S1 in the assembling process in the manufacturing method of FIG. 4.

As shown in FIG. 5, first, the lower bush 320 is fixed to the lower part of the shaft 100 by press-fit adhesion. A motor rotary part in which the sleeve 200, the rotor hub 400 fixed to the outer peripheral surface of the sleeve 200, and the yoke 600 and the magnet 700 fixed to the rotor hub 400 are assembled is disposed so as to face the lower bush 320 via a minute gap to form a unit. The upper bush 310 is fixed to the shaft 100 from above the sleeve 200 so as to face the sleeve 200 via a minute gap (step S1).

Figure 6:
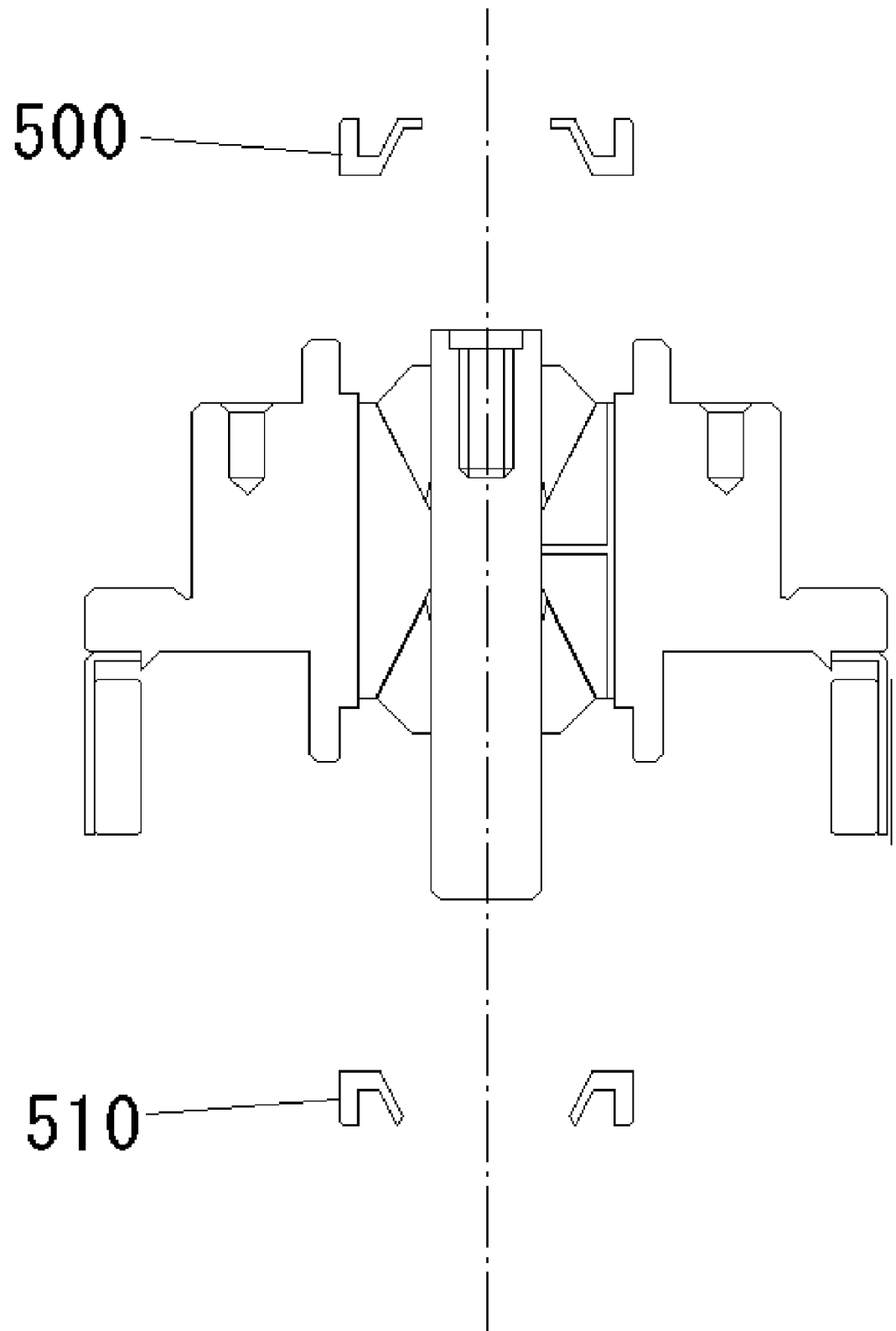
FIG. 6 is a diagram showing step S2 in the assembling process in the manufacturing method of FIG. 4.

Next, as shown in FIG. 6, in the state of the unit in step S1, the upper cover 500 and the lower cover 510 are fixed to the upper bore 431 and the lower bore 412 of the rotor hub 400, respectively by welding (step S2).

Figure 7:
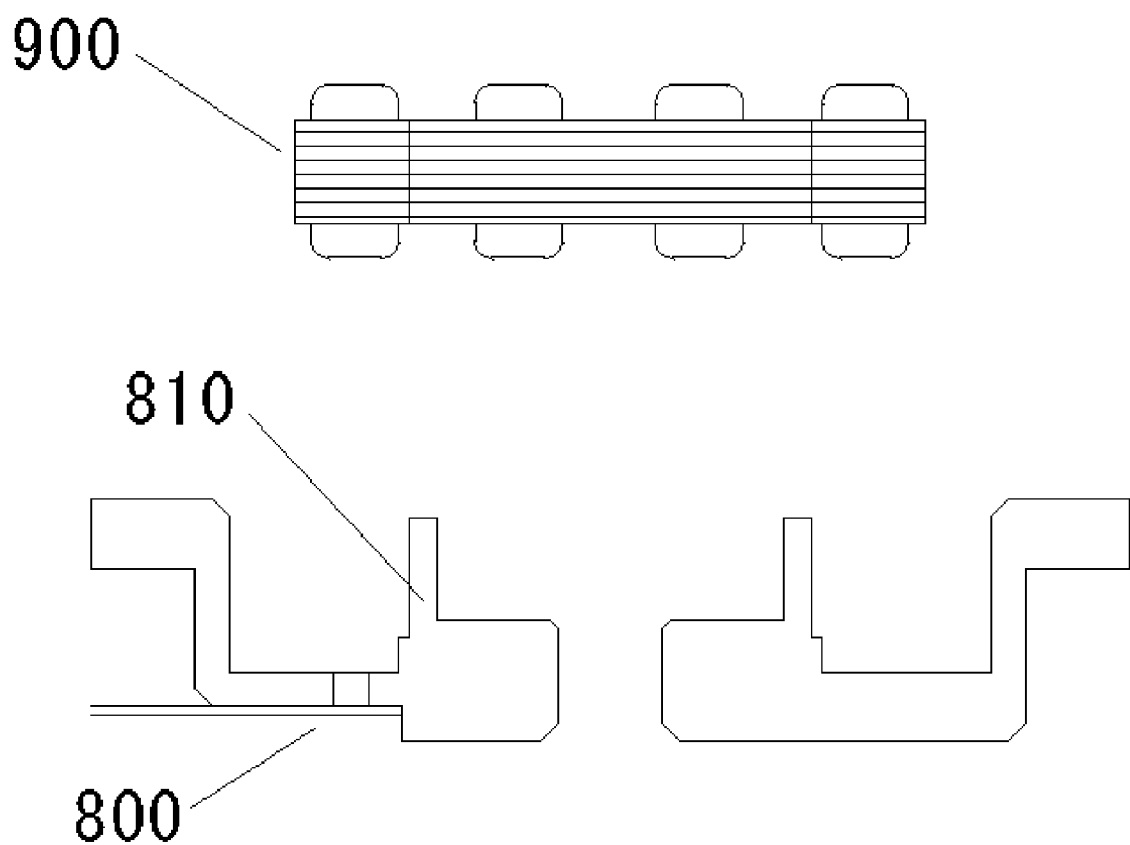
FIG. 7 is a diagram showing step S3 in the assembling process in the manufacturing method of FIG. 4.

As shown in FIG. 7, the stator 900 is fixed to the outer peripheral surface of the inner cylindrical part 810 of the base plate 800 by press-fit adhesion (step S3).

In the state of step S2, the pressure in the peripheral environment is reduced. Consequently, the inside of the bearing formed by the shaft 100, sleeve 200, upper bush 310, lower bush 320, upper cover 500 and lower cover 510 becomes the reduced pressure environment.

Figure 8:
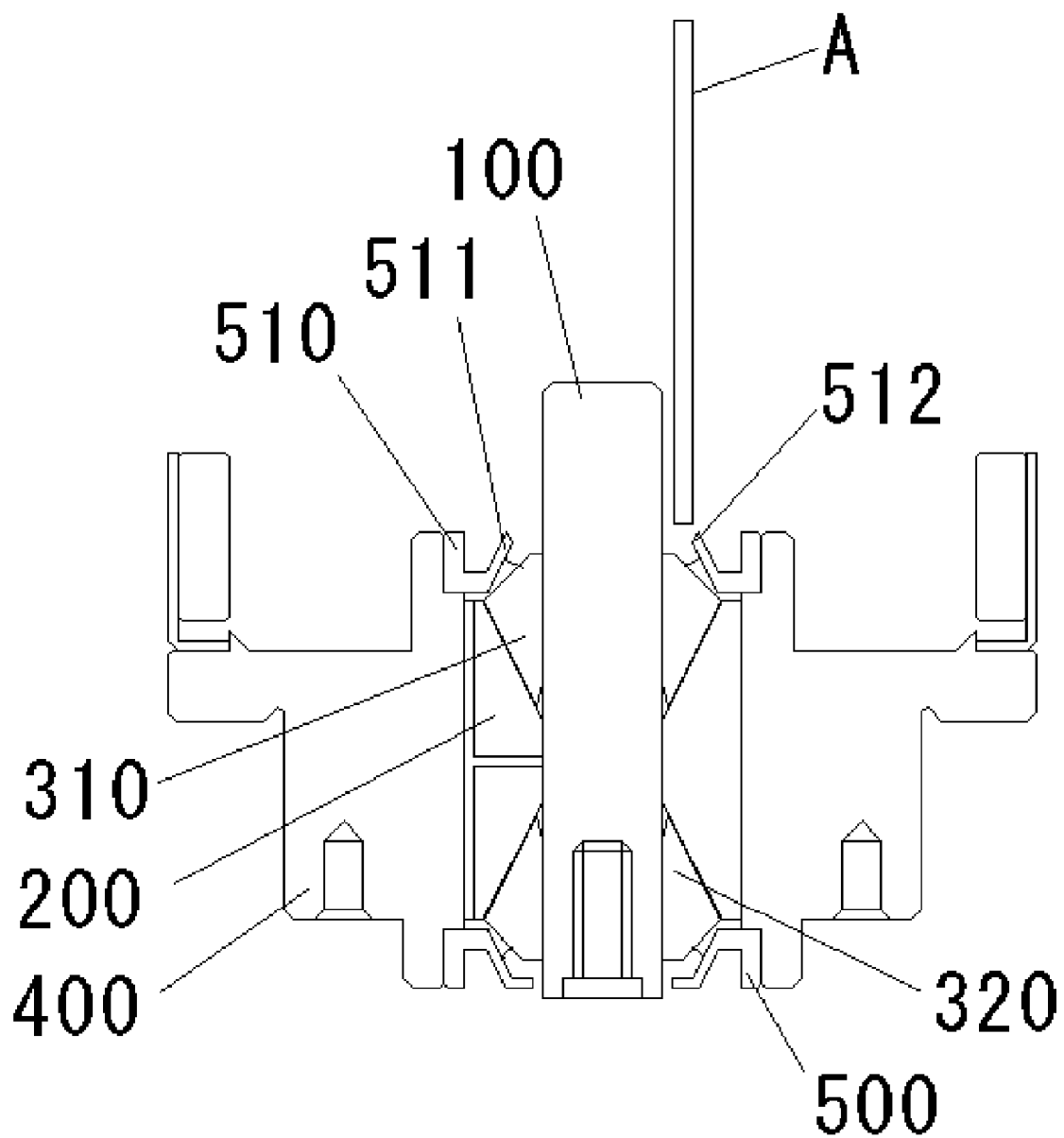
FIG. 8 is a diagram showing steps S4 and S5 in the assembling process in the manufacturing method of FIG. 4.

In this state, oil is infused with a syringe needle A from the clearance between the inner periphery 512 of the lower-cover inside cylindrical part 511 of the lower cover 510 and the outer peripheral surface of the shaft 100 as shown in FIG. 8. The inside of the bearing is filled with the oil and, after that, the oil forms the gas-liquid interface in the small clearance between the upper cover 500 and the shaft 100 (step S4). After that, the pressure in the peripheral environment is recovered to atmospheric pressure (step S5).

The application amount of the oil can be recognized by the position of the gas-liquid interface formed in the gap between the lower cover 510 and the lower bush 320. In the embodiment, the gas-liquid interface formed in the small gap between the lower cover 510 and the lower bush 320 can be easily visually observed from the outside of the lower cover 510. Therefore, the application amount of the oil can be recognized by the position in which the gas-liquid interface is formed.

Moreover, since the clearance is intentionally provided between the lower cover 510 and the shaft 100, the oil can be easily infused. The oil is infused in the reduced pressure environment, so that the oil can be infused in a state where the amount of air bubbles in the bearing is extremely small.

Figure 9:
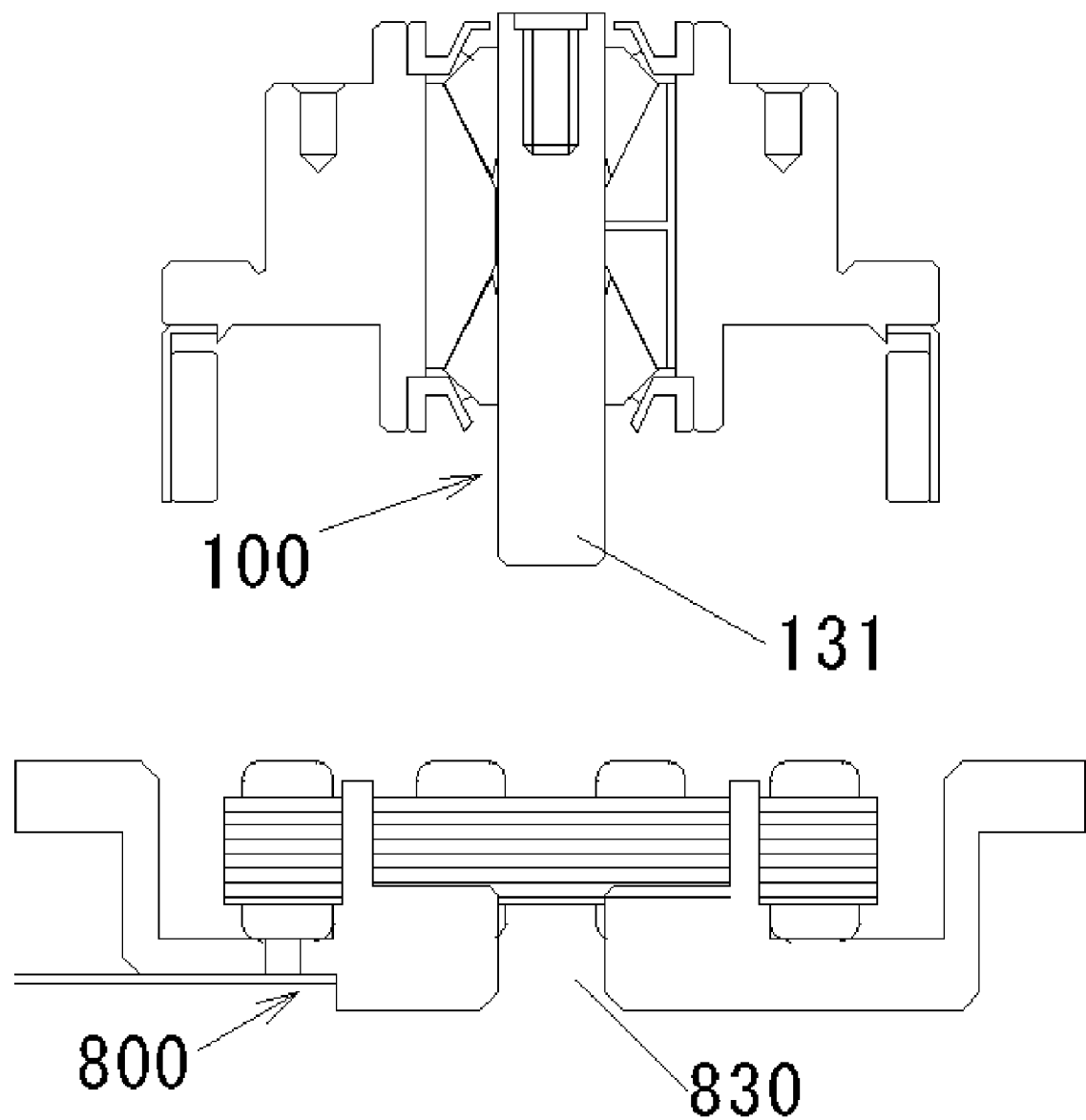
FIG. 9 is a diagram showing step S6 in the assembling process in the manufacturing method of FIG. 4.
Figure 10:
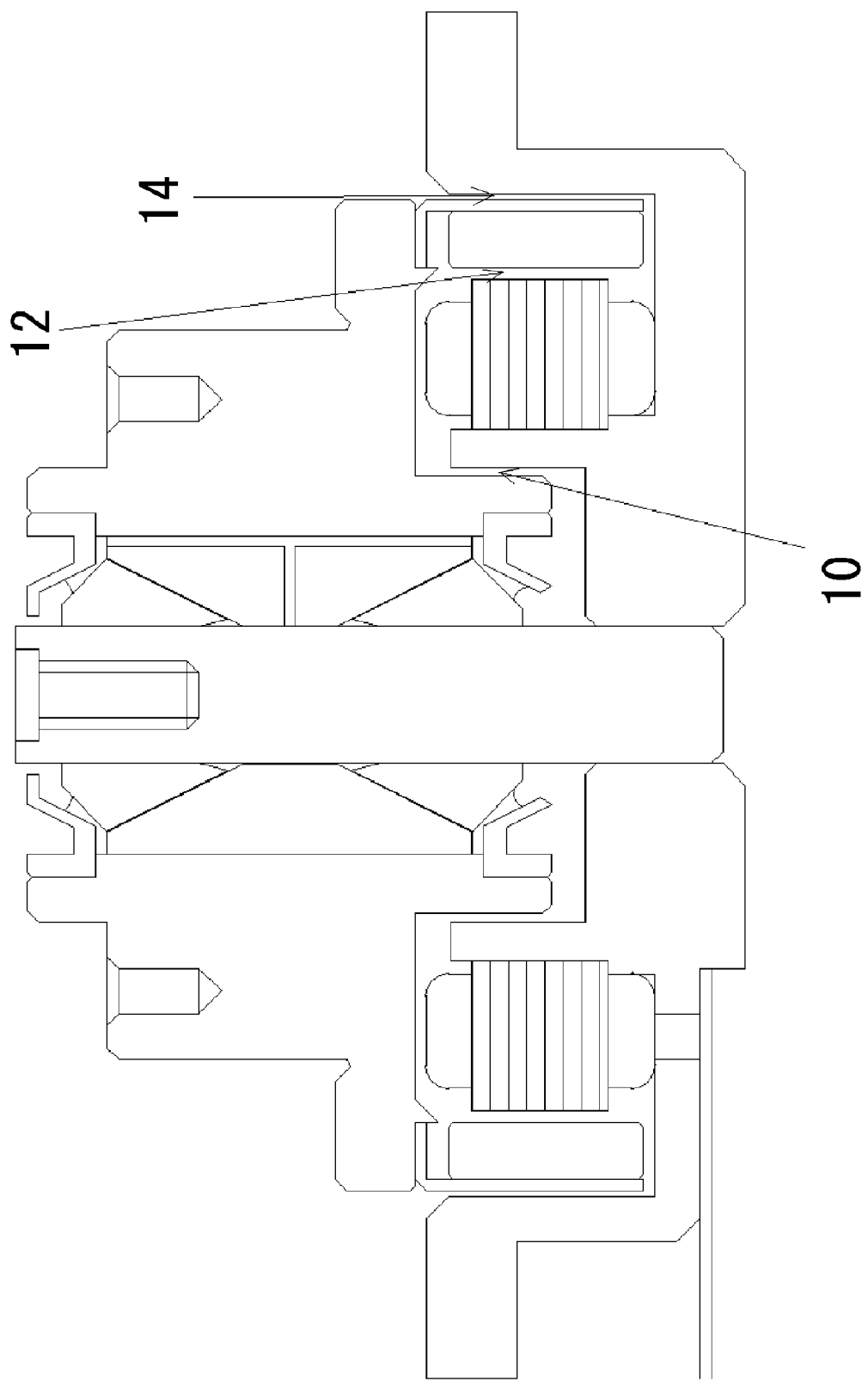
FIG. 10 is a diagram showing small gaps formed in step S6 in the assembling process in the manufacturing method of FIG. 4.

Finally, as shown in FIG. 9, the lower end 131 of the shaft 100 is fixed in the through hole 830 in the base plate 800 manufactured in step S3 by press-fit adhesion (step S6). In such a manner, the first, second, and third small clearances 10, 12, and 14 are formed as shown in FIG. 10.

The clearance between the lower cover 510 and the shaft 100 is formed intentionally wide so that the oil can be easily applied and the position of formation of the gas-liquid interface can be easily visually recognized. There is accordingly the possibility that the oil leaks to the outside of the motor. However, by providing the first, second, and third small clearances 10, 12, and 14, leakage of the oil to the outside of the motor can be prevented. Since there is a complicated long path before the oil leaks to the outside of the motor and the three small clearances are provided, the possibility of leakage of the oil to the outside of the motor can be made almost zero.

If a clearance is provided between the upper cover and the shaft, the oil passes through the clearance and leaks to the outside of the motor by an external shock or the like, that is, the outside of the motor becomes dirty immediately. That is, there is the possibility that a fatal influence is exerted on the recording disk driving apparatus on which the motor is mounted. Therefore, the clearance is not provided between the upper cover 500 and the shaft 100 but is provided between the lower cover 510 and the shaft 100.

The present invention is not limited to the foregoing embodiment but can be variously modified or changed without departing from the scope of the present invention.

Figure 11:
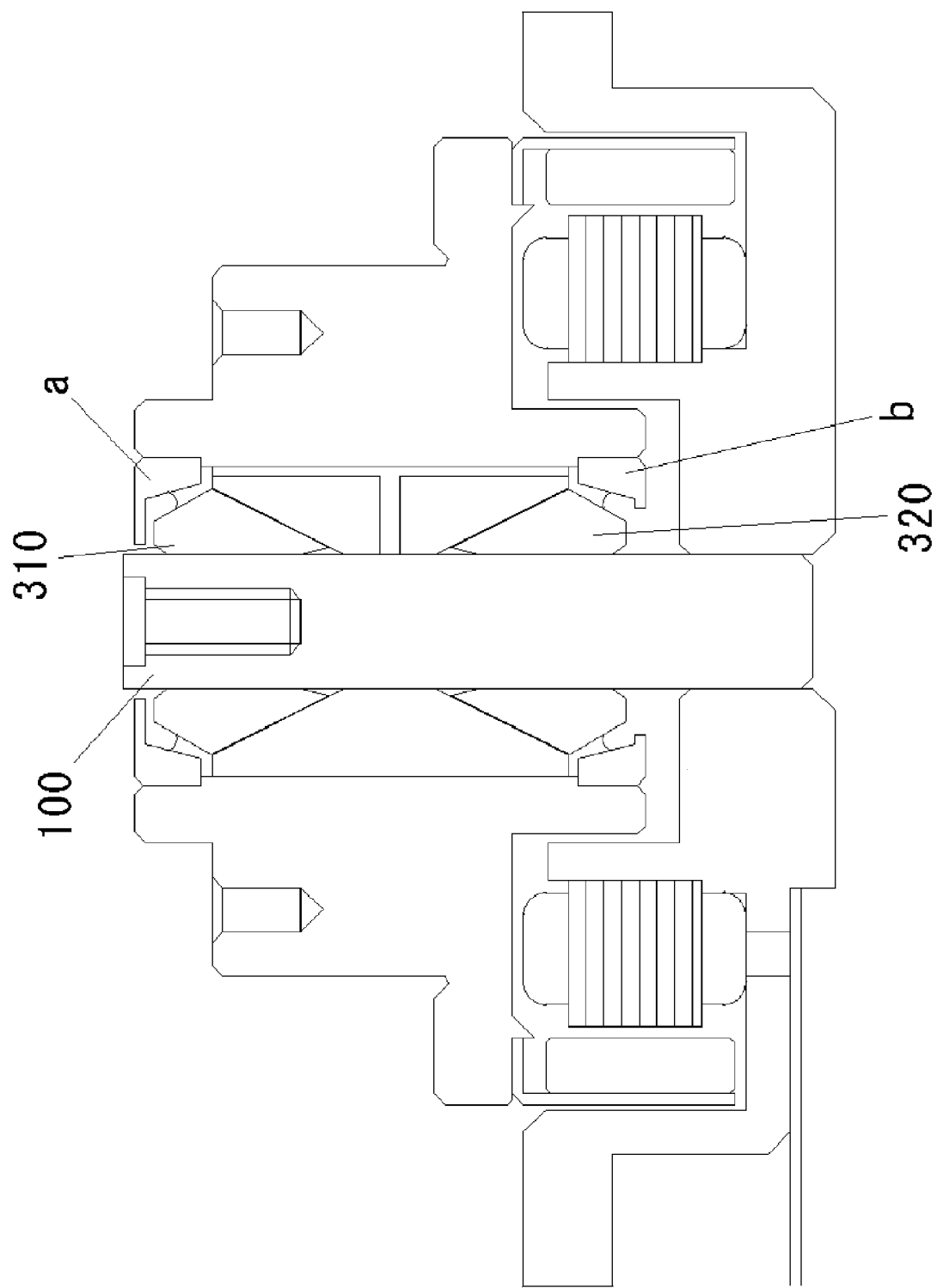
FIG. 11 is a longitudinal section showing another embodiment of the invention.

FIG. 11 shows another example of the upper and lower covers. The structure of FIG. 11 is the same as that of FIG. 1 except for the shapes of the upper and lower covers, so that the detailed description will not be repeated here. In this case as well, a gap is formed by the upper bush 310 and an upper cover "a", a small clearance is formed between the upper cover "a" and the outer peripheral surface of the shaft 100, and a gap is formed between the lower bush 320 and a lower cover "b". Preferably, the gap between the lower cover "b" and the outer peripheral surface of the shaft 100 has dimensions that the gas-liquid interface formed in the small gap between the lower bush 320 and the lower cover "b" can be visually recognized from the outside of the motor.

Figure 12:
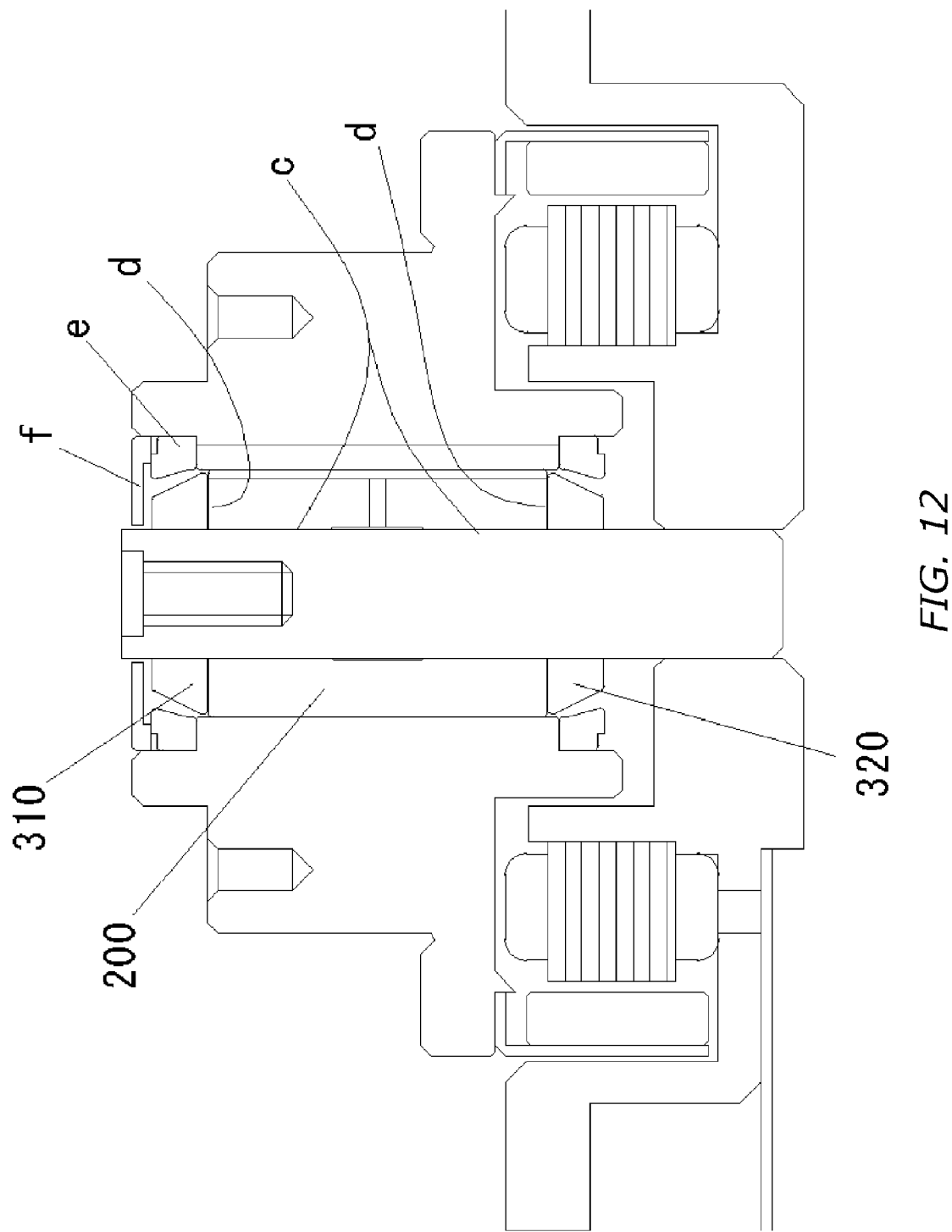
FIG. 12 is a longitudinal section showing another embodiment of the invention.
Figure 13:
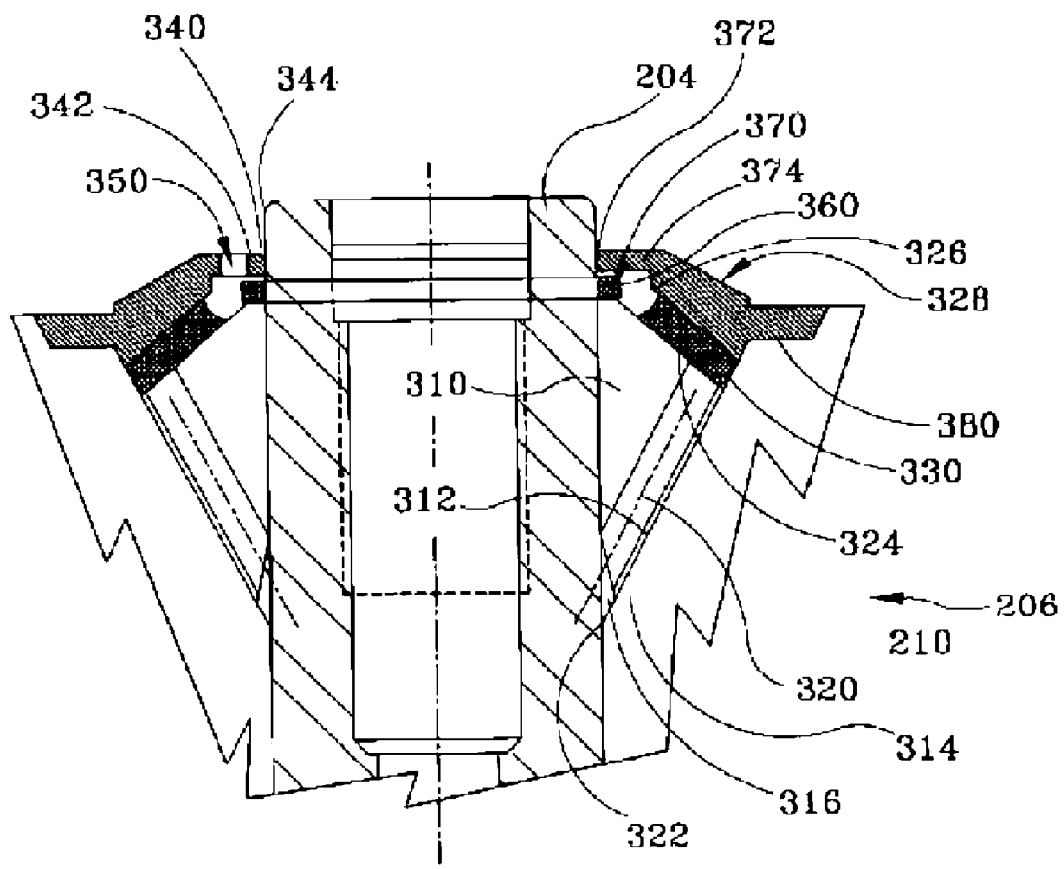
FIG. 13 is a longitudinal section showing a conventional technique.

For example, the kind of the bearing is not limited to that in the foregoing embodiment. The invention can be also applied to a bearing structure such as a radial dynamic bearing "c", a upper thrust dynamic bearing "d" and a lower thrust dynamic bearing "d" as shown in FIG. 12.

The invention is not limited to the structure of the foregoing embodiment in which a gap is formed between the upper cover 500 and the upper bush 310 and the small clearance is formed between the upper cover 500 and the shaft 100. For example, as shown in FIG. 12, different members "e" and "f" may be used. Since the structure of the other part of FIG. 12 is the same as that of FIG. 1, the detailed description will not be repeated.

Although the outer rotor type motor is used in the foregoing embodiment, the invention is not limited to the motor. The invention can be also applied to an inner rotor type motor.

What is claimed is:

1. A spindle motor comprising:
   a base plate;
   a shaft fixed to said base plate at lower end thereof, said shaft comprising an upper bushing and a lower bushing, wherein said lower bushing is located between said upper bushing and said base plate;
   a rotor assembly which is rotatable about said shaft, said rotor assembling including a first bore surface which confronts said upper bushing to define a first gap therebetween, and a second bore surface which confronts said lower bushing to define a second gap therebetween;
   a lubricant which is located in said first and second gaps, wherein an upper gas-liquid interface of said lubricant is located around said shaft at said upper bushing, and a lower gas-liquid interface of said lubricant is located around said shaft at said lower bushing;
   an upper cover which surrounds said shaft, and which is fixed to said rotor assembly and is spaced from said shaft to define a first clearance, wherein said first clearance extends around the shaft and is located between said upper cover and said shaft; and
   a lower cover which surrounds said shaft, and which is fixed to said rotor assembly and is spaced from said shaft to define a second clearance, wherein said second clearance extends around the shaft and is located between said lower cover and said shaft;
   wherein said first clearance is smaller than said second clearance such that a visual sight line to said upper gas-liquid interface does not exist through said first clearance from external said upper cover, and such that a visual sight line to said lower gas-liquid interface does exist through said second clearance from external said lower cover.

2. The spindle motor of claim 1, wherein said first clearance is defined between said shaft and an inner circumferential surface portion of said upper cover, and said second clearance is defined between said shaft and an inner circumferential surface portion of said lower cover.

3. The spindle motor of claim 2, wherein said lower cover comprises a cylindrical part having upper and lower ends each surrounding said shaft, and wherein said inner circumferential surface portion of said lower cover is located at said lower end of said cylindrical part.

4. The spindle motor of claim 3, wherein said upper cover comprises:
   a cylindrical part having upper and lower ends each surrounding said shaft; and
   an upper part extending radially inwards from said upper end of said cylindrical part towards said shaft, and having an inner circumferential edge surface confronting said shaft, wherein said inner circumferential surface portion of said upper cover is located at said inner circumferential edge surface of said upper part.

5. The spindle motor of claim 4, wherein a diameter of said upper end of said cylindrical part of said upper cover is less than a diameter of said lower end of said cylindrical part of said upper cover, and
   wherein a diameter of said upper end of said cylindrical part of said lower cover is more than a diameter of said lower end of said cylindrical part of said lower cover.

6. The spindle motor of claim 5, wherein said upper gas-liquid interface is located between said upper bushing and said cylindrical part of said upper cover, and
   wherein said an lower gas-liquid interface is located between said lower bushing and said cylindrical part of said lower cover.

7. The spindle motor of claim 1, wherein said rotor assembly includes a conduit containing lubricant in fluid communication with said first and second gaps.

8. The spindle motor of claim 1, wherein said rotor assembly comprises:
- a sleeve including said first and second bore surfaces on an inner circumferential surface thereof; and
- a hub fitted over an outer circumferential surface of said sleeve.

9. The spindle motor of claim 8, wherein said upper and lower covers are fixed to said hub so as to be spaced from opposite ends of said sleeve, respectively.

10. The spindle motor of claim 8, wherein said sleeve comprises:
- a groove extending axially on said outer circumferential surface thereof; and
- a conduit extending radially through said sleeve between said groove and said inner circumferential surface of said sleeve.

11. The spindle motor of claim 8, wherein said rotor assembly comprises a rotor magnet unit located between said base plate and a lower circumferential surface region of said hub.

12. The spindle motor of claim 11, wherein said lower cover is located between said rotor magnet unit and said shaft.

13. The spindle motor of claim 12, wherein said lower cover is spaced from said base plate to define an open area therebetween.

14. The spindle motor of claim 11, further comprising a labyrinth seal defined by a first axial extension from said hub which is interposed between said rotor magnet unit and a second axial extension from said base plate.

15. The spindle motor of claim 8, wherein a radial diameter of a surface portion of said upper bushing which confronts said upper bore surface increases in an axial direction away from said base plate, and a radial diameter of a surface portion of said lower bushing which confronts said lower bore surface decreases in an axial direction away from said base plate.

16. The spindle motor of claim 15, wherein an upper thrust fluid dynamic bearing is defined at said first gap between said first bore surface and said upper bushing, and a lower thrust fluid dynamic bearing is defined at said second gap between said second bore surface and said lower bushing.

17. The spindle motor of claim 16, wherein said upper bushing is spaced from said lower bushing to define an intermediate shaft portion therebetween, and wherein said sleeve is space from said intermediate shaft portion to define an intermediate gap therebetween.

18. The spindle motor of claim 17, wherein a radial thrust fluid dynamic bearing is defined at said intermediate gap between said sleeve and said intermediate shaft portion.

* * * * *